US006552812B1

(12) United States Patent
Xu et al.

(10) Patent No.: US 6,552,812 B1
(45) Date of Patent: Apr. 22, 2003

(54) METHOD AND SYSTEM FOR MEASURING THRESHOLD LENGTH

(75) Inventors: Cangshan Xu, Fremont, CA (US); Yuexing Zhao, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 286 days.

(21) Appl. No.: 09/636,340

(22) Filed: Aug. 10, 2000

(51) Int. Cl.[7] .............................................. G01B 11/06
(52) U.S. Cl. ...................... 356/630; 356/632; 356/369
(58) Field of Search ............................ 356/630, 631, 356/632, 364–369; 250/225

(56) References Cited

PUBLICATIONS

Noel Poduje, et al. "Nanotopology Effects in Chemical Mechanical Polishing," presentation at the SEMI–AWG Nanotopology Workshop, Tokyo, Nov. 29, 1999.

D. Boning, et al. "Pattern Dependent Modeling for CMP Optimization and Control," MRS Spring Meeting, *Proc. Symposium P: Chemical Mechanical Polishing,* San Francisco, CA, Apr. 1999.

C. Shan Xu, et al. "A Hidden Cause of Reduced Process Margin in Chemical Mechanical Planarztion: Silicon Substrate Front Surface Topography," VMIC Conference, Sep. 7, 1999.

C. Shan Xu, et al. "Effects of Silicon Front Surface Topography on Silicon Oxide Chemical Mechanical Planarization," *Electrochemical and Solid–State Letters,* 1 (4) 181–183 (1998).

C. Shan Xu, et al. "Quantitative study of chemical mechanical planarization process affected by bare silicon wafer front surface topography," *J. Vac. Sci. Technol. B.* 17(5), Sep./Oct. 1999.

Dennis Okuma Ouma. "Modeling of Chemical Mechanical Polishing for Dielectric Polishing," (Internet downloaded version of) MIT PhD Thesis, Dept. of Electrical Engineering and Computer Science, Nov. 1998.

*Primary Examiner*—Hao Q. Pham
(74) *Attorney, Agent, or Firm*—Brinks Hofer Gilson & Lione

(57) ABSTRACT

A method and system for measuring threshold length of a planarization process, and for comparing the planarization abilities of such processes. The method and system measure a thickness profile of a film on a blanket wafer, and from the thickness profile, a threshold length is calculated.

36 Claims, 8 Drawing Sheets

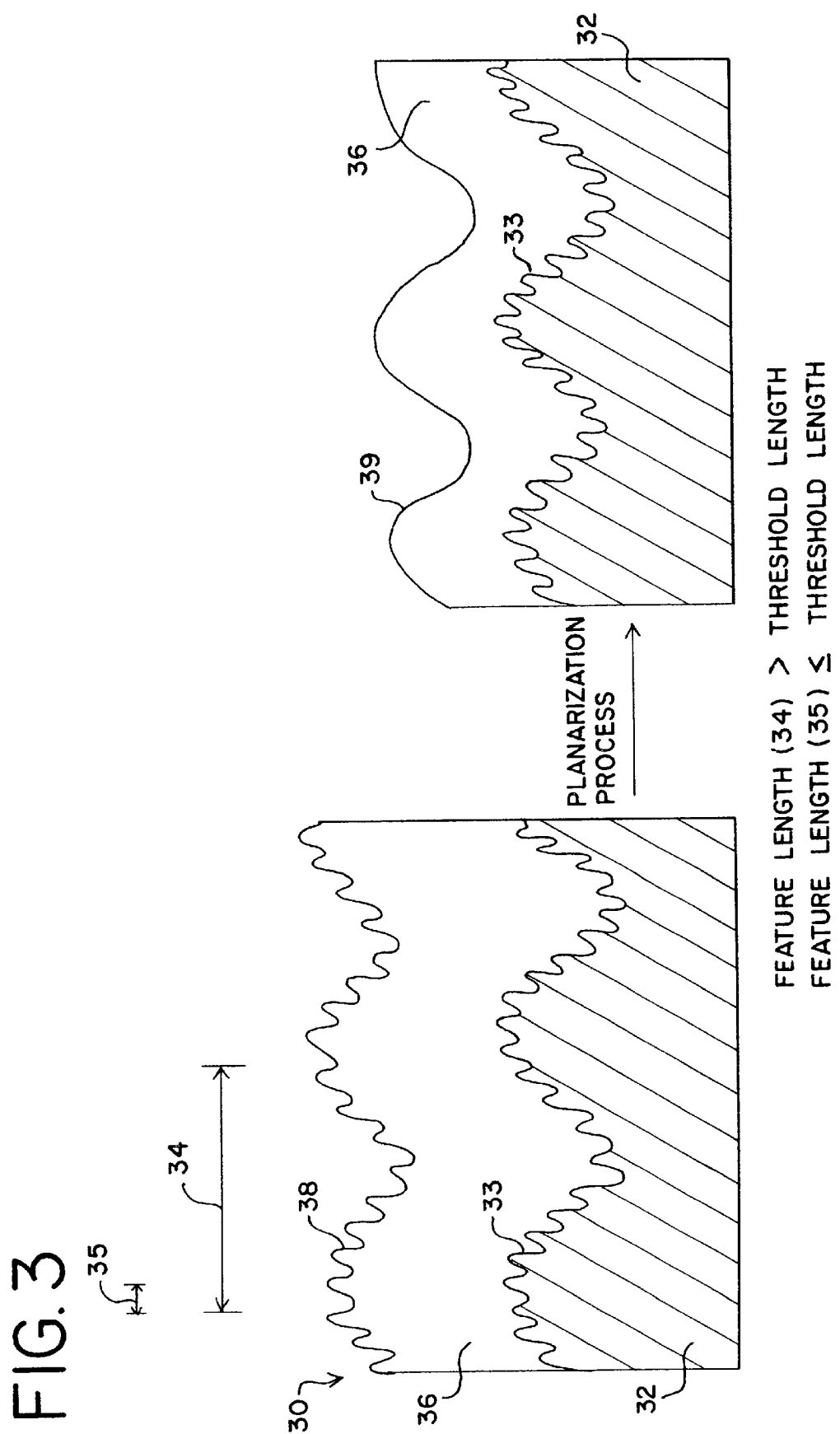

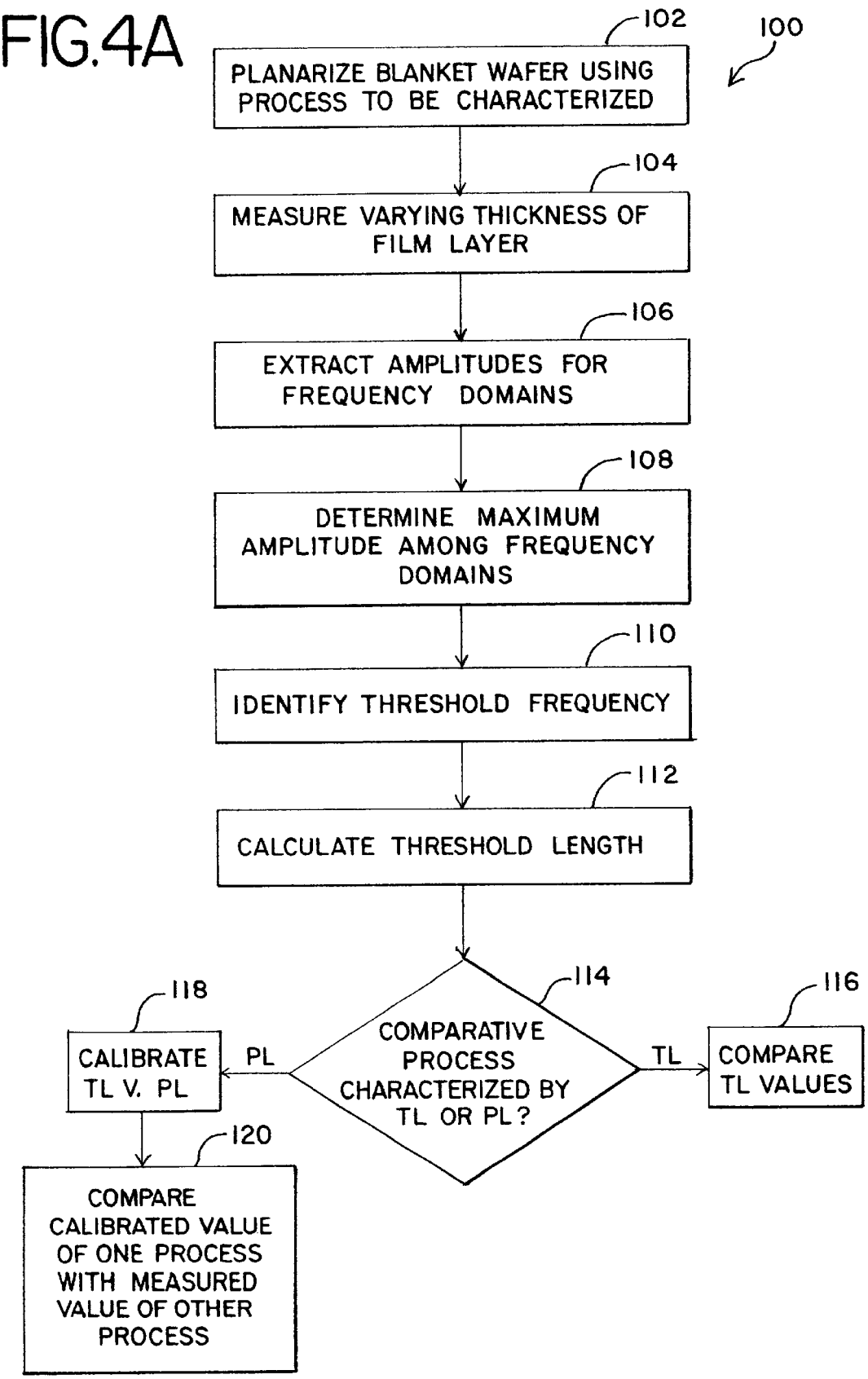

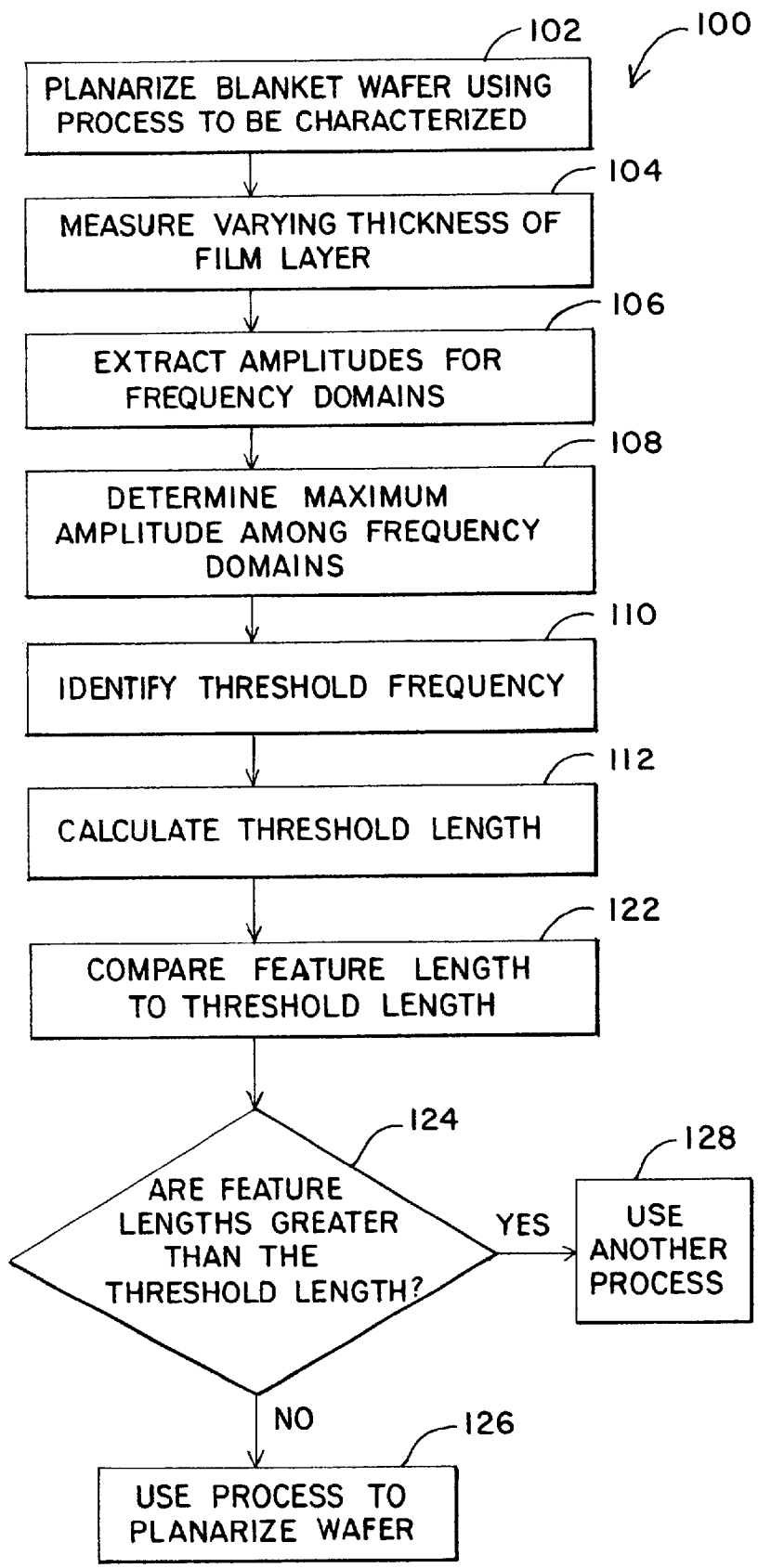

METHOD AND SYSTEM FOR MEASURING THRESHOLD LENGTH

FIELD OF THE INVENTION

The present invention relates to a method and system for measuring an inherent characteristic of a planarization process. In particular, the invention relates to a method and system of measuring a threshold length utilizing a blanket wafer.

BACKGROUND

Many steps in the manufacture of semiconductor devices result in a highly irregular surface on the semiconductor wafer substrate. In order to improve the manufacturability of the devices on the wafer, the surface is ordinarily planarized between processing steps.

A common method of planarization is often referred to as chemical mechanical polishing ("CMP"). CMP is an important improvement in planarization technology because it allows for planarization across larger portions of the wafer. Because this planarization extends across a substantial portion of the wafer, CMP allows for "global planarization" as well as "local planarization."

While CMP techniques have provided substantial improvements in the quality of global planarization, researchers continue to seek new advancements and adjustments to existing processes in order to provide as high a quality of planarization as possible. The concept of "planarization length," first described by Dennis Okuma Ouma of M.I.T. in a thesis entitled *"Modeling of Chemical Mechanical Polishing for Dielectric Planarization,"* is one way in which the quality of a system's global planarization can be evaluated, characterized, and compared.

A known method for measuring planarization length includes measurement of an oxide thickness on a polished patterned wafer utilizing a pattern density mask, and then calculating the planarization length from the measured data. The problem with this method is that the use of patterned wafers requires significant processing time and cost for the patterning steps, or requires purchasing of the density mask. Furthermore, the use of the pattern density mask leads to a complicated data analysis.

Accordingly, there is a need in the art for a simplified method for characterizing a planarization process that saves processing time and is cost efficient.

SUMMARY

The present invention provides a method and system for measuring a new characteristic, defined below as the threshold length, of a planarization process.

In one aspect of the invention, a method is provided for determining the threshold length of a planarization process. The method includes measuring a varying thickness of a film layer on a portion of a blanket wafer, and then calculating the threshold length based upon variations in the thickness of the portion of the blanket wafer.

In another aspect of the invention, a method is provided for characterizing a planarization process. The method includes determining the threshold length of the planarization process using a blanket wafer.

In another aspect of the invention, a method is provided for comparing two or more planarization processes. The method includes determining the threshold length of a first planarization process using a blanket wafer, determining the threshold length of a second planarization process using a blanket wafer, and then comparing the threshold length of the first planarization process to the threshold length of the second planarization process.

In another aspect of the invention, a method for is provided for determining whether a planarization process is effective to planarize a wafer. The method includes calculating the threshold length of the planarization process, and comparing one or more feature lengths of a wafer to the calculated threshold length to determine whether the planarization process would be effective to planarize the wafer.

In another aspect of the invention, a method is provided for comparing two or more planarization processes characterized by different parameters. The method includes determining the threshold length of a first planarization process using a blanket wafer, determining the planarization length of a second planarization process using a patterned wafer, and then comparing the threshold length of the first planarization process to the planarization length of the second planarization process.

In yet another aspect of the invention, a system is provided for measuring the threshold length of a planarization process. The system includes a blanket wafer thickness determinator adapted to measure a varying thickness of a film layer of a blanket wafer and to create a signal indicative of said varying thickness, and a threshold length calculator in communication with the blanket wafer thickness determinator and adapted to calculate a threshold length based upon said signal received from said blanket wafer thickness determinator.

BRIEF DESCRIPTION OF THE DRAWINGS

FIG. 3 is a schematic cross-sectional view of a blanket wafer and illustrates a planarization process in which the wafer has feature lengths that are greater than the planarization process's threshold length, and has feature lengths that are less than the planarization process's threshold length.

FIG. 4A is flow chart of a process for measuring threshold length according to one embodiment of the invention.

FIG. 4B is a flow chart for evaluating the effectiveness of a planarization process according to an alternate embodiment of the invention.

DETAILED DESCRIPTION OF THE PRESENTLY PREFERRED EMBODIMENTS

The "threshold length" of a planarization process, as defined for the first time and as used herein, is an inherent property of a planarization process. The threshold length defines the longest distance that a process is effective to planarize a surface of a wafer having topography features such as "peaks and valleys". The use of the threshold length of a planarization process is best understood with reference to FIGS. 1–3.

Figure 1:
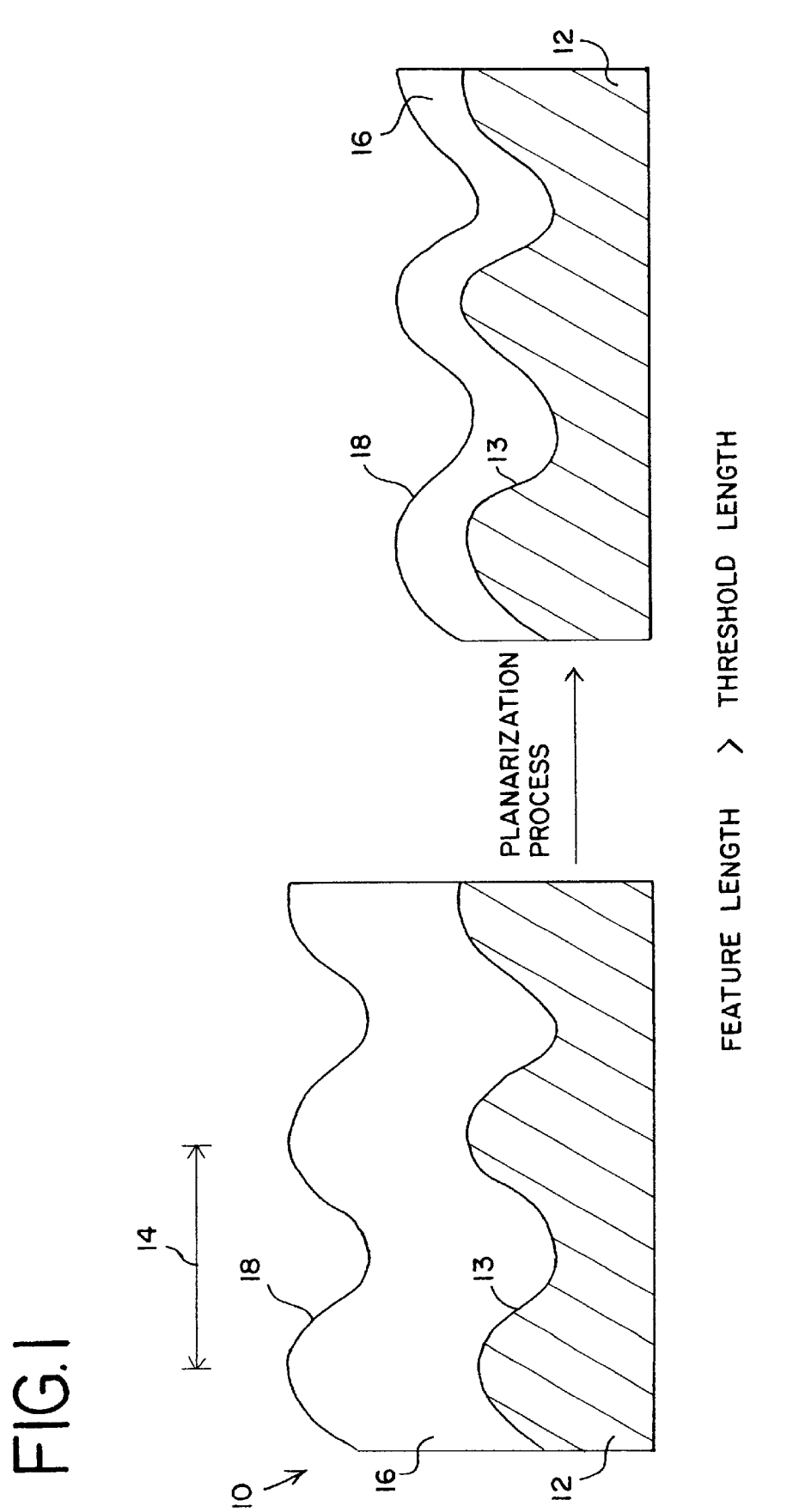
FIG. 1 is a schematic cross-sectional view of a blanket wafer and illustrates a planarization process in which the wafer has a feature length greater than the planarization process's threshold length.

FIG. 1 illustrates a planarization process in which a semiconductor structure, such as blanket wafer 10, has a feature length 14 greater than the threshold length. The blanket wafer 10 includes substrate 12 and a blanket film 16 (the sizes of the components have been exaggerated in order to provide a better understanding of the invention). Typically, the substrate 12 is silicon and the blanket film 16 is an oxide, but those skilled in the art will appreciate that the processes described herein are effective for use with any of the substrates and films known in the semiconductor fabrication art. For example, the film 16 could also be a nitride, or a metal, such as tungsten, copper, or aluminum. The substrate 12 typically will have a topography 13 of features that approximate one or more "feature lengths", defined by the distance indicated by arrow 14. The film 16, which is deposited upon the substrate 12 using conventional blanket deposition methods, has a surface topography 17 which roughly conforms to the surface topography of the substrate 13. After the blanket wafer 12 undergoes a planarization process, such as chemical mechanical polishing, the thickness of the film 16 is reduced. However, because the feature length 14 on the surface of the film 16 is greater than the inherent threshold length of the planarization process, the surface topography 18 is not planarized and still roughly conforms to substrate topography 13.

Figure 2:
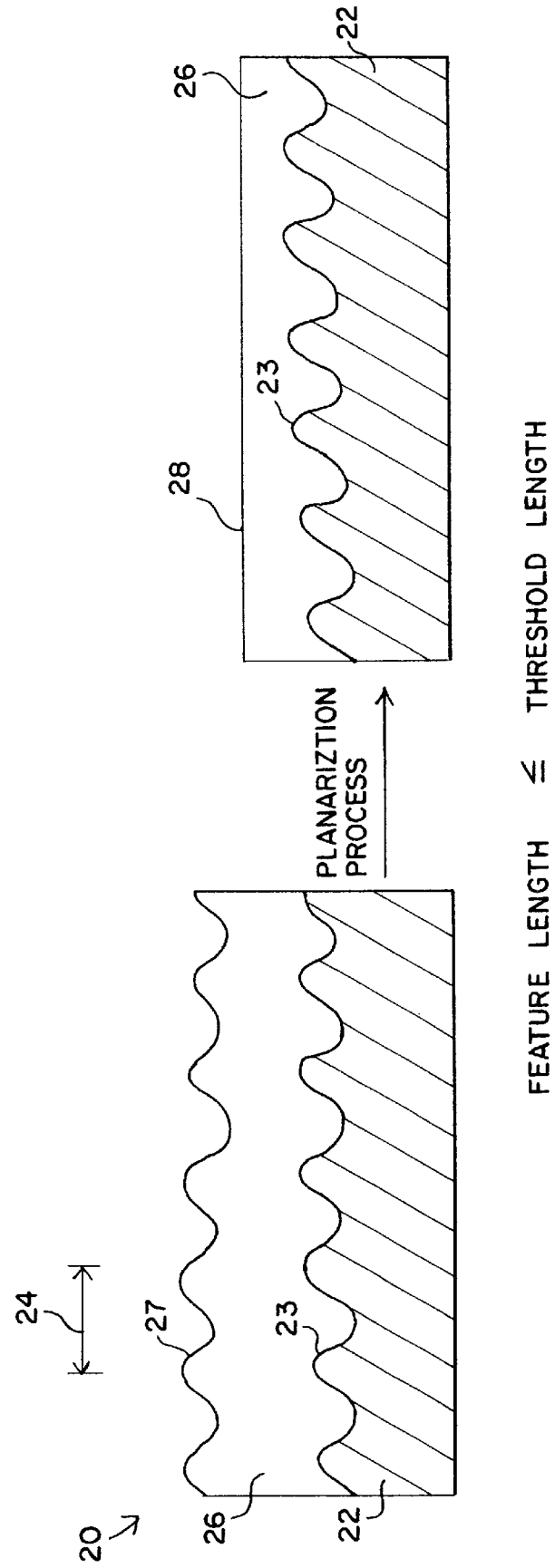
FIG. 2 is a schematic cross-sectional view of a blanket wafer and illustrates a planarization process in which the wafer has a feature length less than or equal to the planarization process's threshold length.

In contrast, FIG. 2 illustrates the same planarization process, but performed on a wafer having a feature length 24 less than or equal to the threshold length of the planarization process. Like in FIG. 1, the blanket wafer of FIG. 2 includes a substrate 22 having a topography 23, and a film 26 having a topography 27 roughly conforming to topography 23. In this case, the surface topography 27 is completely planarized, resulting in a smooth plane 28 having varying thicknesses across the surface of the wafer 20 due to the uneven surface topography 23.

FIG. 3 illustrates a more typical case, where a wafer 30 has various feature lengths. Here, some of the feature lengths are greater than the inherent threshold length, and some are less than the inherent threshold length. For example, the topography 33 of the substrate 32 includes feature lengths, represented by arrow 34, that are longer than the threshold length of the planarization process. Other feature lengths, represented by arrow 35, are shorter than the threshold length. As shown, after the wafer 30 is planarized, the thickness of the film 36 is reduced, and the features that are shorter (having feature length 35) than the threshold length are successfully planarized. However, the features that are longer (having feature length 34) than the threshold lengths are not planarized, but roughly maintain their conformation which approximately corresponds to that of substrate topography 33.

FIGS. 1–3 are illustrative of the concept of threshold length. For simplicity, the features have been shown as having regular patterns. However, those skilled in the art will appreciate that blanket wafers typically have random features of varying lengths, and in random arrangements. Among this spectrum of feature lengths, only those which are shorter the intrinsic threshold length of the planarization process can be successfully planarized.

Referring now to FIGS. 4A and 4B, a method according to the present invention is described. The method 100 is useful for measuring the threshold length of a planarization process, and/or for determining whether a planarization process is capable of effectively planarizing a wafer having surface features of certain lengths. The method is also useful for comparing two planarization processes by comparing their respective threshold lengths. Furthermore, the method may be used to compare a planarization process with another planarization process that have been characterized by other properties, such as "planarization length," as more fully described below.

The method 100 begins with the planarization of a blanket wafer at 102, or alternately, by simply selecting a blanket wafer that has already been planarized. As stated above, the blanket wafers useful include all those known in the art. Particularly preferred blanket wafers are those having a silicon substrate with a blanket film of an oxide of silicon. Also preferred are wafers having a blanket film of a nitride, or a metal, such as tungsten, copper, and aluminum.

The planarization process used at 102 is preferably a chemical mechanical planarization (CMP) process. Many CMP processes are known in the art, including those with rotary and linear polishing, and all are useful for the present invention. A particularly preferred CMP process is one that utilizes the Teres™ CMP System manufactured and sold by Lam Research Corporation of Fremont, Calif.

After the blanket wafer is planarized, the film will have a varying thickness because the film's smoothed surface topography will no longer conform to the surface topography of the substrate (see FIGS. 1–2). This varying thickness of the film is measured, at 104, by one of the thickness measuring devices known in the art. Preferred measuring devices include spectrophotometers, such as dual beam spectrophotometers, spectroscopic ellipsometers, reflectometers, and resistivity detectors, such as a four point probe resistivity detector. Dual-beam spectroscopy is accurate for thicknesses of about 500 Å or higher, and therefore is the preferred method for measuring the film layers, which may be as thick as 2 microns. However, in alternate embodiments where the layer is less than about 500 Å, ellipsometry is the preferred method. Ellipsometry is generally accurate down to about 10 Å.

Suitable instruments for performing dual-beam spectrophotometry include, but are not limited to, devices sold under the model names FT750, UV1050, UV1250, UV1280, or ASET F5, by the KLA-Tencor Corporation of San Jose, Cailf. These instruments also have an operational mode for performing ellipsometry.

Figure 5:
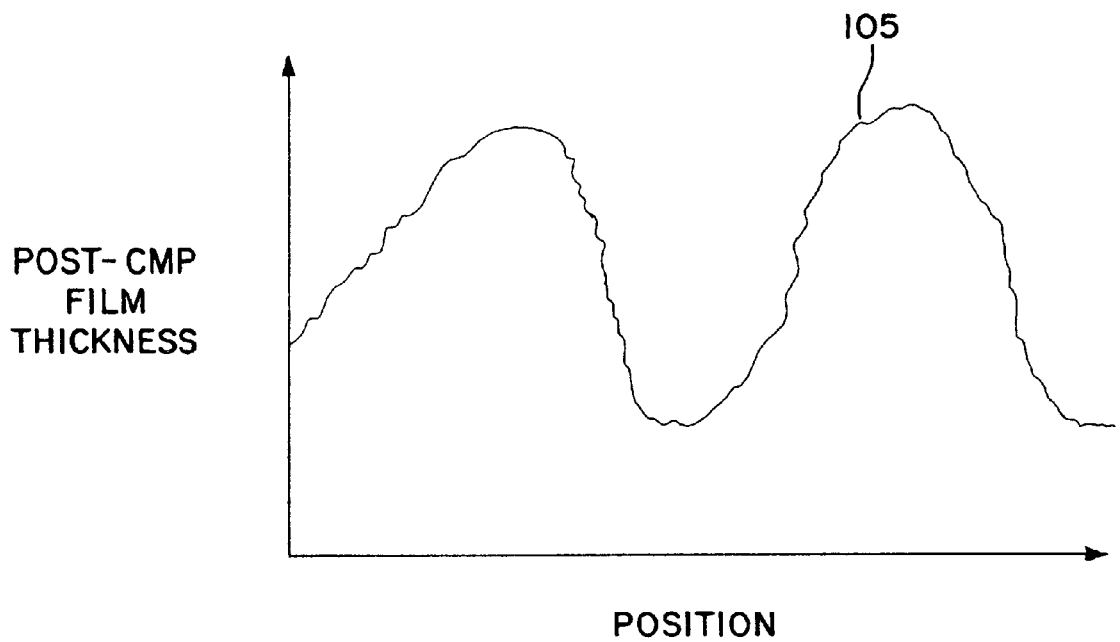
FIG. 5 is graph illustrating the thickness profile of a film on a post-CMP blanket wafer.

The thickness may either be measured or scanned in one dimension, such as along a line in the wafer surface, or may be measured or scanned in two dimensions, such as an area of the wafer surface. The portion of the wafer surface measured may include a small portion of the wafer surface, or more preferably, substantially the entire wafer surface. FIG. 5 illustrates a plot of a signal 105 indicative of the post-CMP film thickness at positions along a one dimensional line of a wafer surface. Those skilled in the art will recognize that a signal could also be generated and processed for two dimensional measurements.

Figure 6:
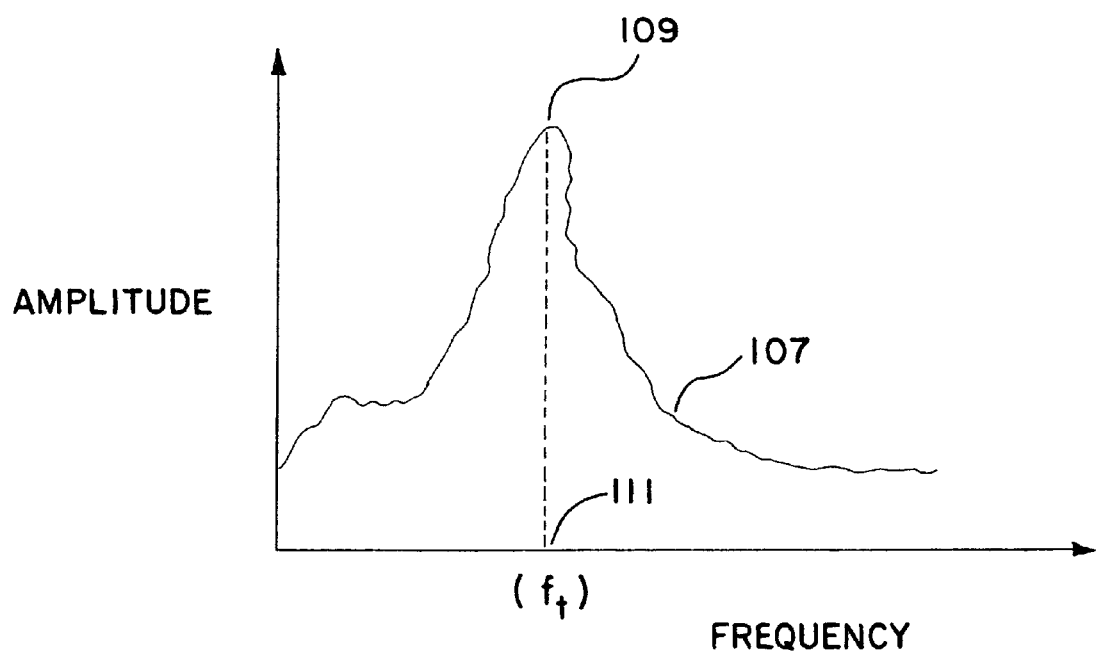
FIG. 6 is a graph illustrating the determination of a maximum amplitude according to one embodiment of the present invention.

After measuring the varying thickness of the film, the amplitudes of various frequency domains are extracted, at 106, from the signal 105. The extraction is typically achieved by a Fourier Transform. Any suitable Fourier Transform known in the art will extract the amplitudes. An example of a suitable Fourier Transform is the Fast Fourier Transform function of Microsoft Excel, licensed by the Microsoft Corp. of Seattle, Wash. FIG. 6 illustrates the extraction of amplitudes 107 for each of a number of frequency domains.

After the amplitudes of the various frequency domains are determined, the maximum amplitude 109 of the extracted amplitudes 107 is determined at 108. This is done by simply comparing each of the amplitudes 107. Next, at 110, the "threshold frequency" (f$_t$) is determined. The threshold frequency 111 is the frequency domain which has the maximum amplitude. From the threshold frequency, the threshold length is calculated, at 112, by formula (I):

$$(f_t)(TL)=1 \qquad (I)$$

where f$_t$=threshold frequency, and

TL=threshold length

In one aspect of the invention, the process is complete by determining the threshold length of the planarization process. The threshold length is a characteristic of the planarization process that can be used to evaluate the process. Rather than evaluate the efficiency of each and every process parameter, such as table speed, relative speed between wafer and polishing surface, down force, deposit depth, slurry type, slurry flow rate, pad type, etc., the threshold length provides a useful composite that can be used to characterize a planarization process.

In other aspects of the invention, the method may be used to compare the relative efficiencies of two or more planarization processes. As shown at 114 in FIG. 4A, other processes may be characterized by threshold length, or by other characterizations, such as planarization lengths. Where another process is characterized by threshold length, the comparison is made by simply comparing, at 116, the respective threshold lengths of the two processes. The process with the longer threshold length can better planarize surfaces with larger feature lengths than the process with the shorter relative threshold length.

The threshold length may also be compared to other defined characteristics, such as the "planarization length" of a system, as first defined by Dennis Okuma Ouma of M.I.T. in a thesis entitled *"Modeling of Chemical Mechanical Polishing for Dielectric Planarization."* The planarization length is defined as the distance over which neighboring topographical features effect polishing at a particular point of interest, or the length scale beyond which the pad cannot achieve global planarity.

FIG. 4B shows an alternate embodiment in which the calculated threshold length is compared, at 122, to at least one feature length of wafer that needs to be planarized. As described above, the planarization process is only effective in planarizing features having feature lengths less than or equal to the threshold length. Consequently, if, at 124, the feature lengths corresponding to the features of interest are not greater than the threshold length, the planarization process is designated, at 126, as a planarization process capable of effectively planarizing the features of interest. Conversely, if the feature lengths are greater than the threshold length, the planarization process is designated, as indicated at 128, as not being capable of effectively planarizing the features of interest, and another process will have to be chosen. Therefore, the threshold length establishes an upper limit of feature length size that a planarization process is capable of planarizing effectively.

Figure 7:
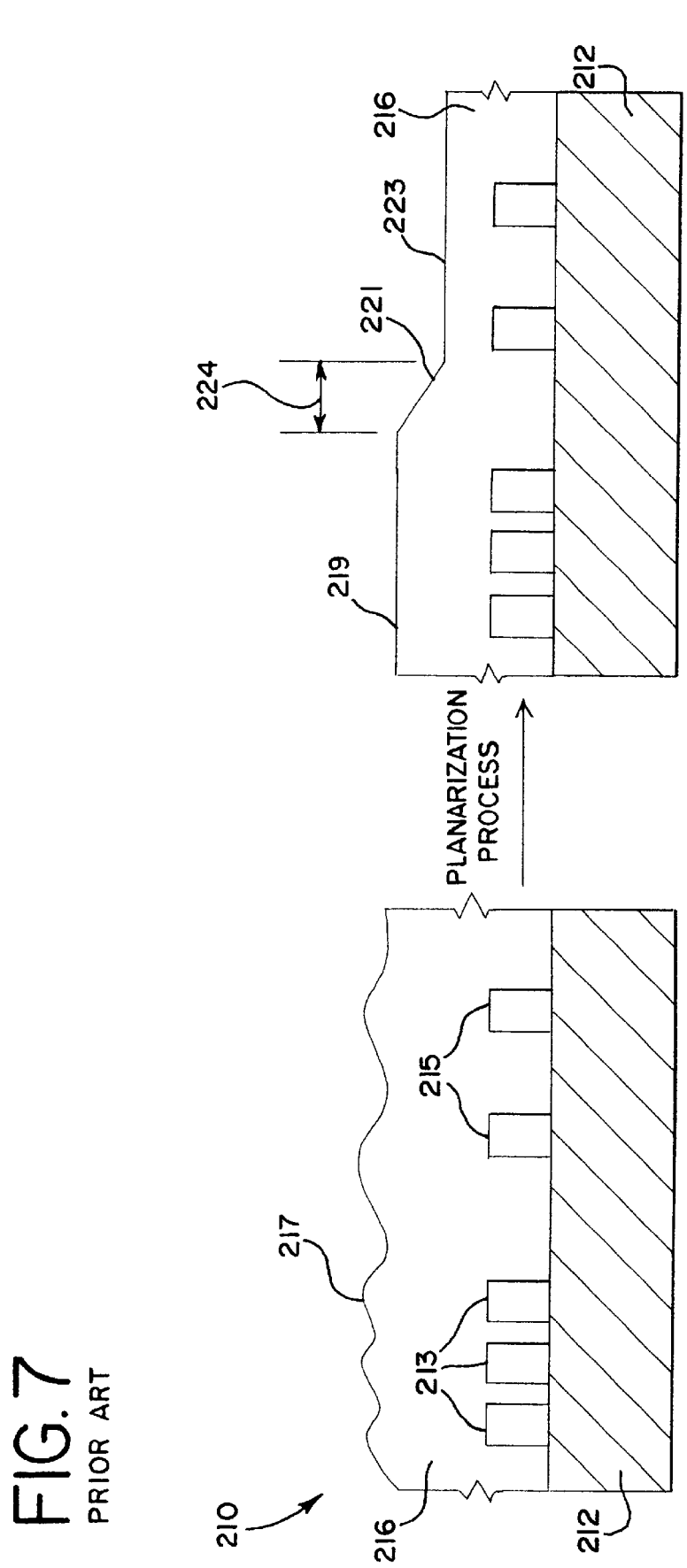
FIG. 7 is schematic cross sectional view of a patterned mask illustrating the characterization of a planarization process with the parameter defined as the planarization length according to the prior art.

FIG. 7 briefly illustrates the concept of planarization length. A patterned mask 210 (which must be fabricated according to a specification set by researchers at M.I.T., or purchased from SKW Associates, Inc. of Fremont, Calif.) includes a substrate 212 having patterned features 213 and 215. The components have varying densities, that is, features 213 have a higher density than features 215. A blanket oxide 216 has a topography roughly conforming to the features 213, 215, respectively. After being planarized, the oxide surface 216 tends to have planar surfaces 219 and 223, but at different heights. The distance defined by 224 is the planarization length, or the distance over which neighboring topographical features effect polishing at a particular point of interest.

A process characterized by the threshold length of the present invention can be compared to a process characterized by planarization length by first calibrating threshold length to planarization length. While not intending to be limited by theory, threshold length is believed to have an approximately linear relationship to planarization length. Accordingly, a calibration curve can be generated by formula (II):

$$(TL)=k(PL) \qquad (II)$$

where TL=threshold length

PL=planarization length and k=constant.

Typically, k is from about 0.5 to about 2. However, k could also be a variable, and more sophisticated curve fitting methods could be used to calibrate the relationship between threshold length and planarization length. Once the relationship is calibrated, at 118, the calibrated threshold length of one process could be compared, at 120, to the measured threshold length of another process, or alternately, the calibrated planarization length of one process could be compared to the measured planarization length of the other process.

The present invention provides an improvement to prior planarization process characterizations such as planarization length because it does not require the use of a patterned mask. This saves significant time and cost by eliminating patterning steps. It has been found empirically that although blanket wafers provide random features in their substrate topography, these feature average each other to an extent that the use of one blanket wafer on one process and another blanket wafer on another process provides an accurate comparison without the need for identical patterned wafers.

Figure 8:
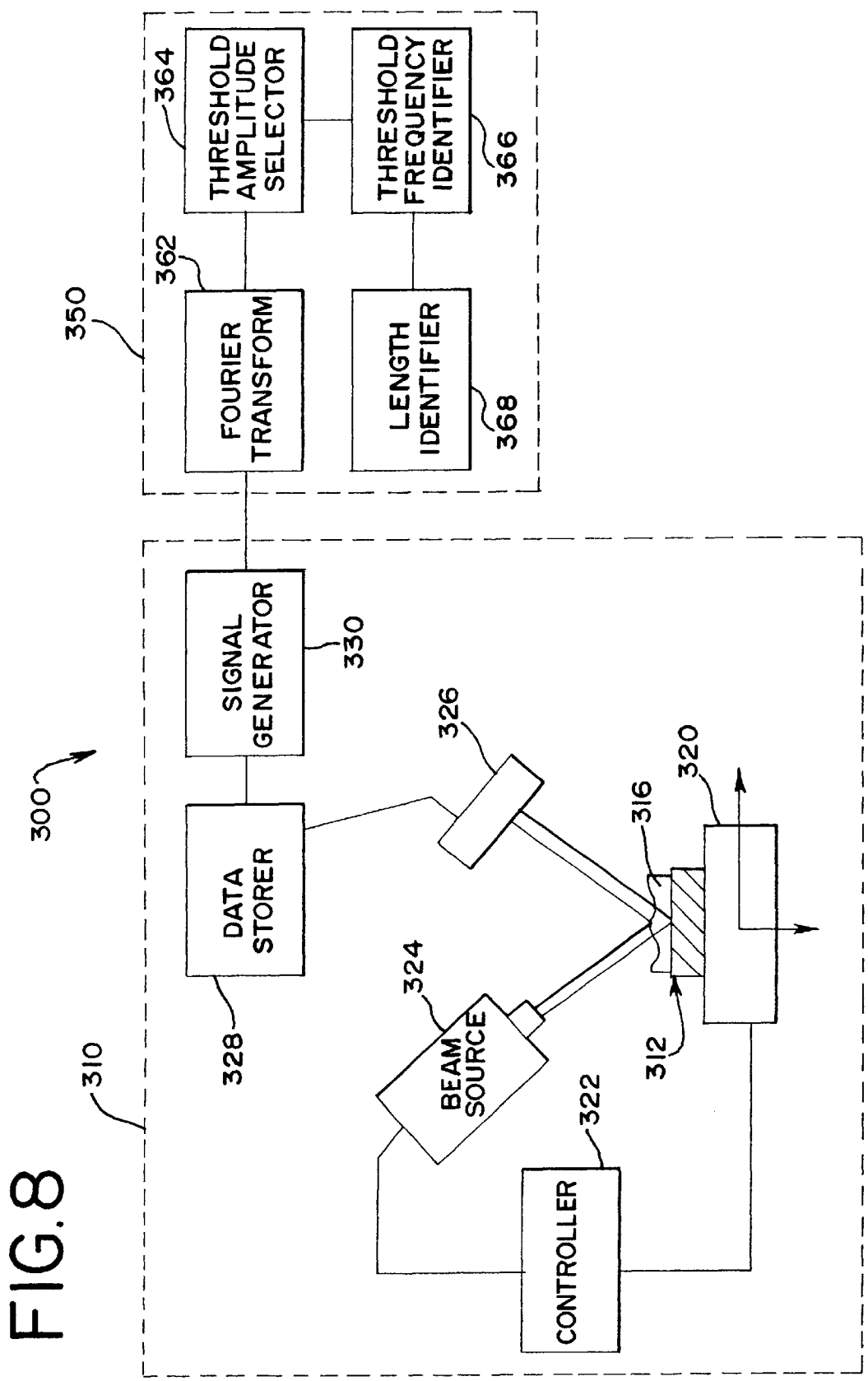
FIG. 8 is a schematic view of a system for measuring threshold length according to one embodiment of the present invention.

FIG. 8 illustrates an exemplary system according to another aspect of the present invention. The system 300 generally includes a measuring subsystem 310, defining a blanket wafer thickness determinator, and a processing sub-system 350, defining a threshold length calculator. The measuring sub-system 310 includes a measuring device, in this example defined by a dual beam spectrophotometer source 324, an interference detector 326, and a table 320 moveable under the control of controller 322. As mentioned above, other measuring devices known in the art, such as spectroscopic ellipsometers, resistivity detectors, and reflectometers, could alternately be used. The measuring device measures the thickness of at least a portion of the film layer 316 of a blanket wafer 312.

The measurements recorded by the detector 326 are stored in a data storer 328, such as a hard-drive or a floppy disk. The information in the data storer 328 can either be manually moved to the threshold length calculator 350, or can be turned into a signal in signal generator 330, where the signal can be delivered via a network to the threshold length calculator 350.

The threshold length calculator 350 is preferably a microprocessor, such as a personal computer, having software which includes a Fourier Transform 362, a threshold amplitude selector 364, a threshold frequency identifier 366, and a length identifier 368. The Fourier Transform 362 receives a signal indicative of the thickness of the film on the blanket wafer, and extracts amplitudes into frequency domains, as described above with reference to FIGS. 4 and 5. Next, the threshold amplitude selector 364 selects the maximum amplitude from the plurality of amplitudes, as described above with reference to FIGS. 4 and 6. The threshold frequency identifier 366 then identifies the threshold frequency having the greatest amplitude (again with reference to FIG. 6), and then the length calculator 368 calculates the threshold length according to formula (I) above.

Accordingly, while the present invention has been described herein in detail in relation to specific embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for determining the threshold length of a planarization process, the method comprising:
   measuring a varying thickness of a film layer on a portion of a blanket wafer;
   calculating the threshold length based upon variations in the thickness of said portion of said blanket wafer.

2. The method of claim 1, wherein the planarization process is a chemical mechanical planarization process.

3. The method of claim 1, further comprising:
   prior to said measuring, polishing said blanket wafer utilizing the planarization process.

4. The method of claim 1, wherein said film is an oxide film.

5. The method of claim 1, wherein said film is a nitride film.

6. The method of claim 1, wherein said film is a metal film.

7. The method of claim 1, wherein said measuring comprises one dimensional thickness scanning of said portion of said blanket wafer.

8. The method of claim 1, wherein said measuring comprises two dimensional thickness scanning of said portion of said blanket wafer.

9. The method of claim 1, wherein said portion comprises a line.

10. The method of claim 1, wherein said portion comprises an area.

11. The method of claim 10, wherein said area comprises substantially the entire surface of said blanket wafer.

12. The method of claim 1, wherein said measuring comprises the use of reflectometry.

13. The method of claim 1, wherein said measuring comprises the use of dual beam spectrophotometry.

14. The method of claim 1, wherein said measuring comprises the use spectroscopic ellipsometry.

15. The method of claim 1, wherein said measuring comprises the use of four point probe resistivity detection.

16. The method of claim 1, wherein said calculating comprises a Fourier transform to extract amplitudes at a plurality of various frequency domains.

17. The method of claim 16, wherein said calculating further comprising determination of a maximum amplitude of said extracted amplitudes.

18. The method of claim 17, wherein said calculating further comprises identifying the threshold frequency having said maximum amplitude.

19. The method of claim 18, wherein said calculating further comprises calculating said threshold length as the inverse of said threshold frequency.

20. A method for determining whether a planarization process is effective to planarize a wafer, comprising:
    calculating the threshold length of the planarization process; and
    comparing at least one feature length of a wafer to said calculated threshold length to determine whether the planarization process would be effective to planarize said wafer.

21. The method of claim 20, wherein calculating the threshold length comprises:
    measuring a varying thickness of a film layer on a portion of a blanket wafer;
    calculating the threshold length based upon variations in the thickness of said portion of said blanket wafer.

22. A method for comparing two planarization processes, the method comprising;
    determining the threshold length of a first planarization process using a blanket wafer;
    determining the threshold length of a second planarization process using a blanket wafer; and
    comparing the threshold length of said first planarization process to the threshold length of said second planarization process.

23. The method of claim 22, wherein determining the threshold length for each planarization process comprises:
    measuring a varying thickness of a film layer on at least a portion of said blanket wafer;
    calculating the threshold length based upon variations in the film thickness of said portion of said blanket wafer.

24. The method of claim 22, wherein the planarization processes are chemical mechanical planarization processes.

25. A method for comparing two planarization processes, the method comprising:
    determining the threshold length of a first planarization process using a blanket wafer;
    determining the planarization length of a second planarization process using a patterned wafer; and
    comparing the threshold length of said first planarization process to the planarization length of said second planarization process.

26. The method of claim 25, wherein determining the threshold length for said first planarization process comprises:
    measuring a varying thickness of a film layer on at least a portion of said blanket wafer;
    calculating the threshold length based upon variations in the film thickness of said portion of said blanket wafer.

27. The method of claim 25, wherein said comparing comprises:
    determining a calibrated planarization length corresponding to the threshold length of said first planarization process;
    comparing said calibrated planarization length to the planarization length of said second planarization process.

28. The method of claim 25, wherein said comparing comprises:

determining a calibrated threshold length corresponding to the planarization length of said second planarization process; and comparing said calibrated threshold length to the threshold length of said first planarization process.

29. The method of claim 25, wherein the planarization process is a chemical mechanical planarization process.

30. A system for measuring the threshold length of a planarization process, the system comprising:

a blanket wafer thickness determinator, said blanket wafer thickness determinator adapted to measure a varying thickness of a film layer of a blanket wafer and to create a signal indicative of said varying thickness; and a threshold length calculator in communication with said blanket wafer thickness determinator and adapted to calculate a threshold length based upon said signal received from said blanket wafer thickness determinator.

31. The system of claim 30, wherein said blanket wafer thickness determinator comprises a dual beam spectrophotometer.

32. The system of claim 30, wherein said blanket wafer thickness determinator comprises a spectroscopic ellipsometer.

33. The system of claim 30, wherein said blanket wafer thickness determinator comprises a reflectometer.

34. The system of claim 30, wherein said blanket wafer thickness determinator comprises a four point probe resistivity detector.

35. The system of claim 30, wherein said threshold length calculator comprises a Fourier transformer.

36. The system of claim 30, wherein said threshold length calculator further comprises a maximum amplitude identifier.

* * * * *